(12) United States Patent
Crittenden

(10) Patent No.: US 11,922,799 B2
(45) Date of Patent: Mar. 5, 2024

(54) APPARATUS AND METHOD FOR A WARNING SYSTEM

(71) Applicant: Charles R. Crittenden, Chattanooga, TN (US)

(72) Inventor: Charles R. Crittenden, Chattanooga, TN (US)

( * ) Notice: Subject to any disclaimer, the term of this patent is extended or adjusted under 35 U.S.C. 154(b) by 0 days.

(21) Appl. No.: 17/722,693

(22) Filed: Apr. 18, 2022

(65) Prior Publication Data

US 2022/0335793 A1 Oct. 20, 2022

Related U.S. Application Data

(60) Provisional application No. 63/267,391, filed on Feb. 1, 2022, provisional application No. 63/262,343, filed on Oct. 10, 2021, provisional application No. 63/201,199, filed on Apr. 17, 2021.

(51) Int. Cl.
| | |
|---|---|
| G08B 7/06 | (2006.01) |
| G01S 7/481 | (2006.01) |
| G01S 17/04 | (2020.01) |
| G01S 17/931 | (2020.01) |
| G08B 21/04 | (2006.01) |
| G08G 1/056 | (2006.01) |
| G08G 1/16 | (2006.01) |

(52) U.S. Cl.
CPC .............. *G08B 7/06* (2013.01); *G01S 7/4813* (2013.01); *G01S 17/04* (2020.01); *G01S 17/931* (2020.01); *G08B 21/043* (2013.01); *G08G 1/056* (2013.01); *G08G 1/166* (2013.01)

(58) Field of Classification Search
CPC ....... G08B 7/06; G08B 21/043; G01S 17/931; G01S 17/04; G01S 7/4813
See application file for complete search history.

(56) References Cited

U.S. PATENT DOCUMENTS

| | | | | |
|---|---|---|---|---|
| 4,408,195 | A * | 10/1983 | Tullis | B66C 15/065 340/685 |
| 6,181,251 | B1 * | 1/2001 | Kelly | G08B 17/00 362/147 |
| 7,088,284 | B2 * | 8/2006 | Young | G01S 13/04 342/28 |
| 9,097,800 | B1 * | 8/2015 | Zhu | G01S 13/931 |
| 9,728,085 | B2 * | 8/2017 | Schwarz | G08G 1/042 |
| 9,940,839 | B2 * | 4/2018 | Stafford | E01F 9/615 |
| 9,950,685 | B1 * | 4/2018 | Deyaf | B60R 21/12 |
| 11,069,082 | B1 * | 7/2021 | Ebrahimi Afrouzi | G06T 7/593 |
| 2005/0104764 | A1 * | 5/2005 | Young | G01S 13/04 342/27 |
| 2005/0174251 | A1 * | 8/2005 | Terry, III | G08B 7/062 340/506 |
| 2012/0044475 | A1 * | 2/2012 | Yang | F41G 1/473 356/3 |
| 2015/0035677 | A1 * | 2/2015 | Williams | G01J 5/0025 340/573.1 |

(Continued)

*Primary Examiner* — Hoi C Lau
(74) *Attorney, Agent, or Firm* — Miller & Martin PLLC

(57) ABSTRACT

A warning system having a plurality of components including a Lidar device, an adjustment means, an audio source, a light source, a controller, and a power source. The warning system produces at least one of the audible sound and the light signal when the one or more laser beams detects a foreign object. A method for providing a warning in the event a foreign object is detected.

20 Claims, 24 Drawing Sheets

(56) References Cited

U.S. PATENT DOCUMENTS

| | | | |
|---|---|---|---|
| 2015/0124238 A1* | 5/2015 | Sakai | G06V 10/145 |
| | | | 356/4.01 |
| 2015/0332563 A1* | 11/2015 | Davis | G08B 5/004 |
| | | | 342/66 |
| 2017/0003381 A1* | 1/2017 | Chung | G01S 17/10 |
| 2017/0307758 A1* | 10/2017 | Pei | G01S 7/4816 |
| 2017/0329211 A1* | 11/2017 | Chien | F21V 23/06 |
| 2018/0040209 A1* | 2/2018 | Lim | G08B 5/22 |
| 2018/0132285 A1* | 5/2018 | Jackson | G08G 1/166 |
| 2018/0347752 A1* | 12/2018 | Costello | G01S 17/89 |
| 2018/0350215 A1* | 12/2018 | Hsieh | G08B 7/064 |
| 2019/0162823 A1* | 5/2019 | Eckstein | G01S 7/4814 |
| 2020/0033458 A1* | 1/2020 | Stryjewski | H04B 10/118 |
| 2020/0219264 A1* | 7/2020 | Brunner | G01S 7/4808 |
| 2020/0225673 A1* | 7/2020 | Ebrahimi Afrouzi | |
| | | | G05D 1/0044 |
| 2021/0025706 A1* | 1/2021 | Millane | G01C 15/004 |
| 2021/0115642 A1* | 4/2021 | Almy | E02D 7/06 |
| 2022/0120905 A1* | 4/2022 | Wachter | G01S 7/484 |
| 2022/0146670 A1* | 5/2022 | Sanchez | G02B 27/1006 |
| 2022/0157135 A1* | 5/2022 | Cho | G08B 5/006 |
| 2022/0335793 A1* | 10/2022 | Crittenden | G08G 1/056 |

* cited by examiner

APPARATUS AND METHOD FOR A WARNING SYSTEM

CROSS-REFERENCES TO RELATED APPLICATIONS/PATENTS

This application relates back to and claims the benefit of priority from U.S. Provisional Application for Patent Ser. No. 63/201,199 titled OverWatch and dated Apr. 17, 2021, U.S. Provisional Application for Patent Ser. No. 63/262,343 titled ALPHA OverWatch Road Safety System and dated Oct. 10, 2021, and U.S. Provisional Application for Patent Ser. No. 63/267,391 titled Alpha Overwatch Vehicular Collision Prevention System and dated Feb. 1, 2022.

FIELD OF THE INVENTION

The present invention relates generally to apparatuses and methods for warning systems, and particularly to apparatuses and methods for audible warning systems for distracted drivers.

BACKGROUND AND DESCRIPTION OF THE PRIOR ART

It is known to use apparatuses and methods to provide warnings in the event of a distracted driver. Conventional apparatuses and methods, however, suffer from one or more disadvantages. For example, conventional warning systems and methods do not provide an audible and/or visual warning. More particularly, conventional warning systems and methods do not provide an audible communication to a distracted driver. Conventional warning systems and methods are also not operable independent of networked computers, vehicles, mobile/cellular devices, Wi-Fi devices, and/or secondary surfaces. Further, conventional warning systems and methods are not modular, portable and/or mobile. Still further, conventional warning systems and methods are not adapted to detect vehicles travelling in the wrong direction or count vehicles. In addition, conventional warning systems and methods are not adapted to prevent falls. Conventional warning systems and methods are also not adapted to perform imminent threat detection.

It would be desirable, therefore, if an apparatus and method for a warning system could be provided that would provide an audible and/or visual warning. More particularly, it would be desirable if such a warning system could provide an audible communication to a distracted driver. It would also be desirable if such an apparatus and method for a warning system could be provided that is operable independent of networked computers, vehicles, mobile/cellular devices, Wi-Fi devices, and/or secondary surfaces. It would be further desirable if such an apparatus and method for a warning system could be provided that is modular, portable and/or mobile. It would be still further desirable if such an apparatus and method for a warning system could be provided that would detect vehicles travelling in the wrong direction or count vehicles. In addition, it would be desirable if such an apparatus and method for a warning system could be provided that would prevent falls. It would also be desirable if such an apparatus and method for a warning system and method that is adapted to perform imminent threat detection.

Advantages of the Preferred Embodiments of the Invention

Accordingly, it is an advantage of the preferred embodiments of the invention claimed herein to provide an apparatus and method for a warning system that provides an audible and/or visual warning. More particularly, it is an advantage of the preferred embodiments of the invention claimed herein to provide an apparatus and method for a warning system that provides an audible communication to a distracted driver. It is also an advantage of the preferred embodiments of the invention claimed herein to provide an apparatus and method for a warning system that is operable independent of networked computers, vehicles, mobile/cellular devices, Wi-Fi devices, and/or secondary surfaces. It is another advantage of the preferred embodiments of the invention claimed herein to provide an apparatus and method for a warning system that is modular, portable, and/or mobile. It is still another advantage of the preferred embodiments of the invention claimed herein to provide an apparatus and method for a warning system that detects vehicles travelling in the wrong direction or count vehicles. It is yet another advantage of the preferred embodiments of the invention claimed herein to provide an apparatus and method for a warning system that prevents falls. It is also an advantage of the preferred embodiments of the invention claimed herein to provide an apparatus and method for a warning system and method that is adapted to perform imminent threat detection.

Additional advantages of the preferred embodiments of the invention will become apparent from an examination of the drawings and the ensuing description.

Explanation of the Technical Terms

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "adjustment means" means any device, mechanism, assembly, or combination thereof adapted to adjust, aim or otherwise affect the operation and/or positioning of the warning system. The term "adjustment means" includes, without limitations, manual adjustment means such as an extended handle, a threaded fastener assembly, and the like; motorized adjustment means; and automated adjustment means.

The term "controller" means any device, mechanism, assembly or combination thereof that is adapted to receive, interpret, execute and/or convey instructions, or control an application or process using computer logic. The term "controller" includes, without limitation, automatic controllers such as programmable logic controllers, microcontrollers, and microprocessors, and non-automatic or manually operated controllers.

The term "Lidar device" means any device, mechanism, assembly, or combination thereof adapted to use light and/or lasers to detect and determine ranges by targeting an object or a surface. The term "Lidar device" includes, without limitation, 3-D laser scanning devices, mechanisms, assemblies, and combinations thereof, and contemplates the use of ultraviolet, visible, and/or near infrared light.

The term "mounting means" means any device, mechanism, assembly, or combination thereof adapted to mount, secure, attach, connect, or affix one object to another. The term "mounting means" includes, without limitation, permanent mounting means such as weldments and the like and temporary mounting means such as threaded fasteners and the like.

The term "power source" means any device, mechanism, assembly, or combination thereof adapted to produce, generate, or provide power, energy, or force to the warning system. The term "power source" includes, without limitation, mechanical power sources such as motors, engines, and the like; chemical power sources such as batteries, cells, and the like; and electrical power sources such as generators, power stations, and the like.

The term "secondary surface" means a device, mechanism, assembly or combination thereof that is adapted to reflect, deflect, or otherwise alter the direction of a laser beam.

SUMMARY OF THE INVENTION

The apparatus of the invention comprises a warning system having a plurality of components including a Lidar device that is adapted to emit one or more laser beams, an adjustment means that is adapted to adjust the Lidar device, an audio source that is adapted to generate an audible sound, a light source that is adapted to generate a light signal, a controller that is adapted to control one or more of the plurality of components of the system, and a power source that is adapted to provide power to one or more of the plurality of components of the system. Preferably, the warning system produces at least one of the audible sound and the light signal when the one or more laser beams detects a foreign object.

The method of the invention comprises a method for providing a warning in the event a foreign object is detected. The preferred method comprises providing a warning system having a plurality of components including a Lidar device that is adapted to emit one or more laser beams, an adjustment means that is adapted to adjust the Lidar device, an audio source that is adapted to generate an audible sound, a light source that is adapted to generate a light signal, a controller that is adapted to control one or more of the plurality of components of the system, and a power source that is adapted to provide power to one or more of the plurality of components of the system. Preferably, the warning system produces at least one of the audible sound and the light signal when the one or more laser beams detects a foreign object. The preferred method also comprises providing a warning in the event a foreign object is detected.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
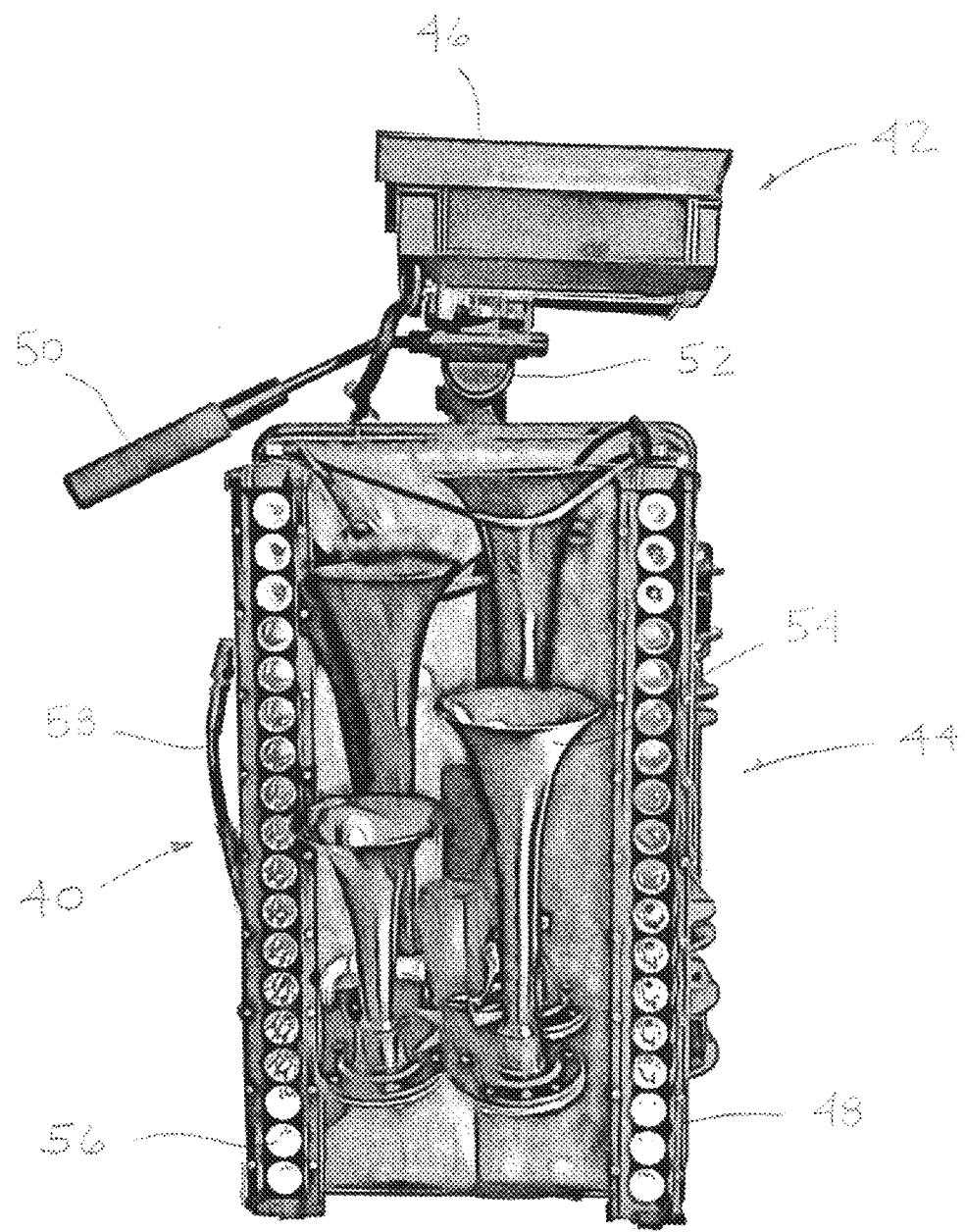
FIG. 1 is a front view of the preferred embodiment of the warning system in accordance with the present invention.

Referring now to the drawings, the preferred embodiments of the warning system in accordance with the present invention are illustrated in FIGS. 1 through 24. Referring now to FIG. 1, a front view of the preferred embodiment of the warning system in accordance with the present invention is illustrated. As shown in FIG. 1, the preferred warning system is designated generally by reference numeral 40. Preferred warning system 40 comprises top portion 42, bottom portion 44, upper housing 46, lower housing 48, first adjustment means 50, second adjustment means 52, audio source 54, light source 56, and hose 58.

Still referring to FIG. 1, preferred warning system 40 produces at least one of the audible sound and the light signal when the one or more laser beams detect a foreign object. Preferred warning system 40 is also adapted to be operable independent of networked computers, a vehicle, a mobile device, a cellular device, a Wi-Fi device, and a secondary surface. Preferred warning system is further adapted to be portable and mobile, detect a vehicle travelling in the wrong direction, count vehicles, and prevent a fall. In addition, preferred warning system 40 is adapted to be operable independent of networked computers, a vehicle, a mobile device, a cellular device, a Wi-Fi device, and a secondary surface, it is also contemplated within the scope of the invention that the warning system in accordance with the present invention may also be operable using one or more of networked computers, a vehicle, a mobile device, a cellular device, a Wi-Fi device, and a secondary surface. While FIG. 1 illustrates the preferred configuration and arrangement of the warning system in accordance with the present invention, it is contemplated within the scope of the invention that the warning system may be of any suitable configuration and arrangement.

Figure 2:
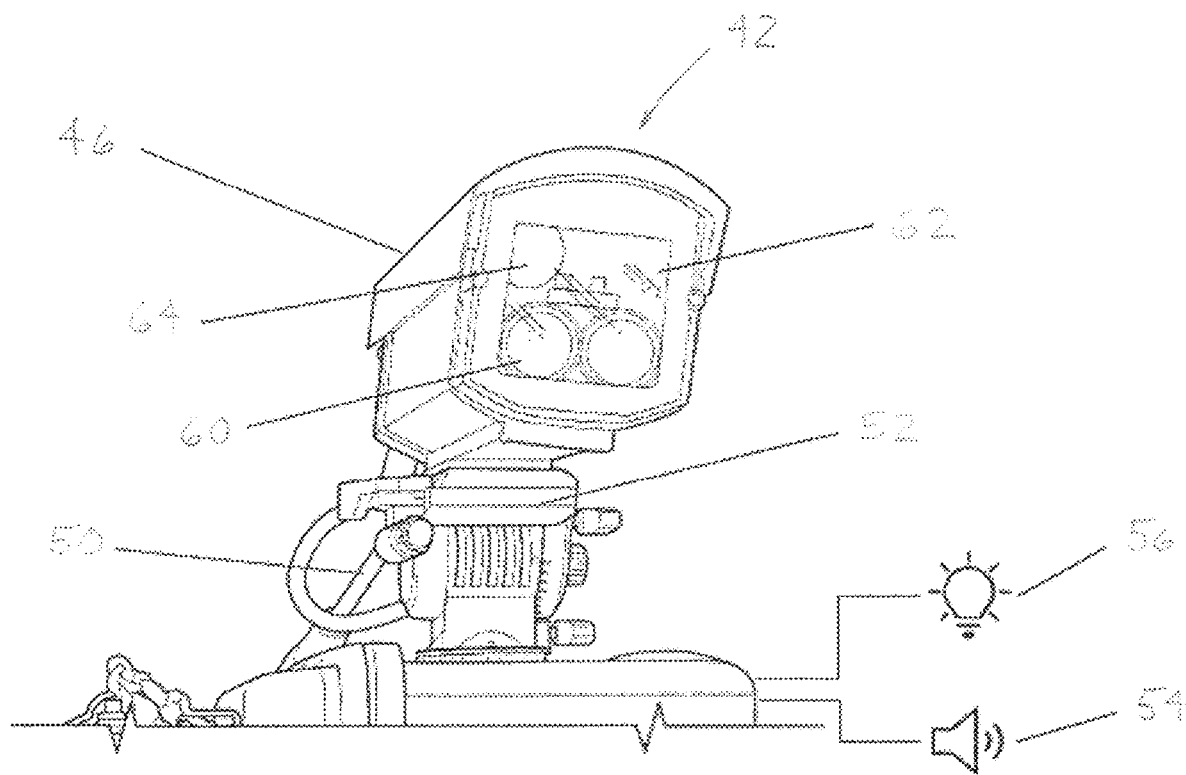
FIG. 2 is a front perspective view of the top portion of preferred embodiment of the warning system in accordance with the present invention.

Referring now to FIG. 2, a front perspective view of the top portion of preferred embodiment of the warning system in accordance with the invention is illustrated. As shown in FIG. 2, the preferred top portion of warning system 40 is designated generally by reference numeral 42. Preferred warning system 40 is adapted to be portable and/or mobile and comprises upper housing 46 which is adapted to house one or more of the plurality of components of the system. Preferred warning system 40 also comprises Lidar device 60 which is adapted to emit one or more laser beams. Preferred warning system 40 further comprises first adjustment means 50 and second adjustment means 52 which are adapted to adjust Lidar device 60. Still further, preferred warning system 40 comprises lens cover 62 which is adapted to protect Lidar device 60 and sighting laser 64 which is adapted to assist the operator with aiming the warning system. In addition, preferred warning system 40 comprises audio source 54 which is adapted to generate an audible sound and light source 56 which is adapted to generate a light signal.

Figure 3:
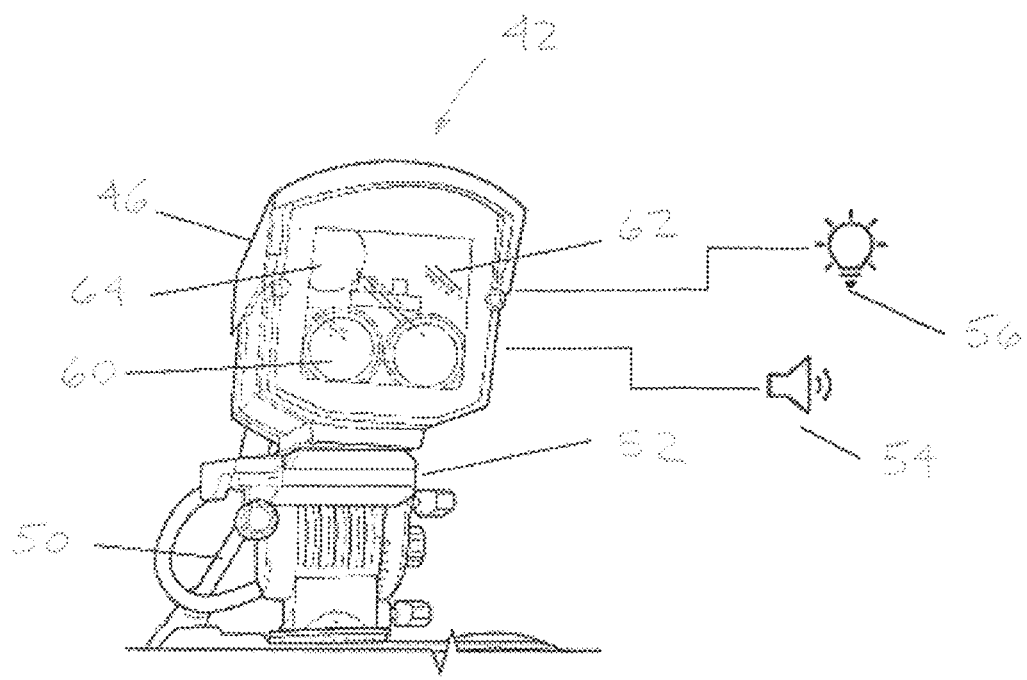
FIG. 3 is a front view of the top portion of the preferred embodiment of the warning system illustrated in FIG. 2.

Referring now to FIG. 3, a front view of the top portion of preferred warning system 40 is illustrated. As shown in FIG. 3, preferred top portion 42 comprises upper housing 46, first adjustment means 50, second adjustment means 52, audio source 54, light source 56, Lidar device 60, lens cover 62, and sighting laser 64.

Figure 4:
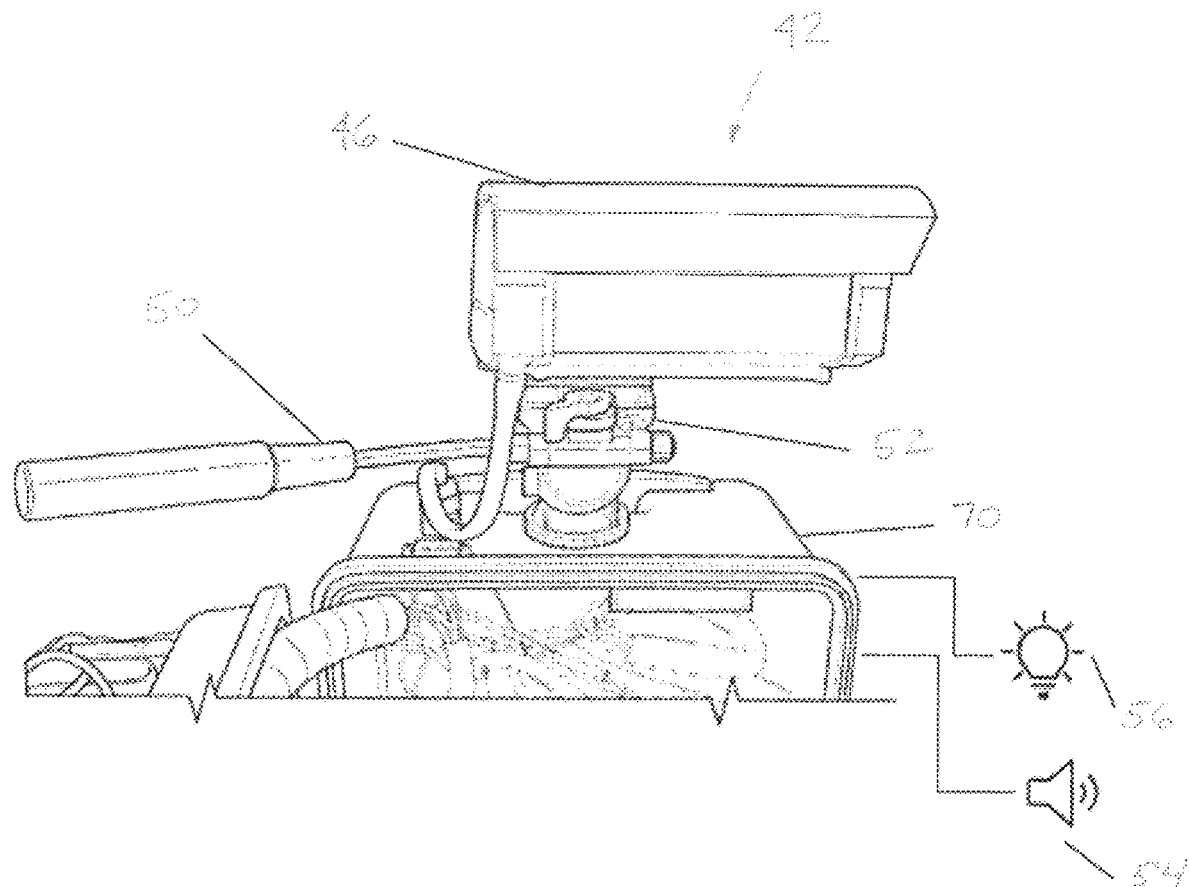
FIG. 4 is a left side view of the top portion of the preferred embodiment of the warning system illustrated in FIGS. 1-2.

Referring now to FIG. 4, a left side view of the top portion of preferred warning system 40 is illustrated. As shown in FIG. 4, preferred top portion 42 comprises upper housing 46, first adjustment means 50, second adjustment means 52, audio source 54, and light source 56. Preferred top portion 42 is adjustably attached to lower housing 70.

Figure 5:
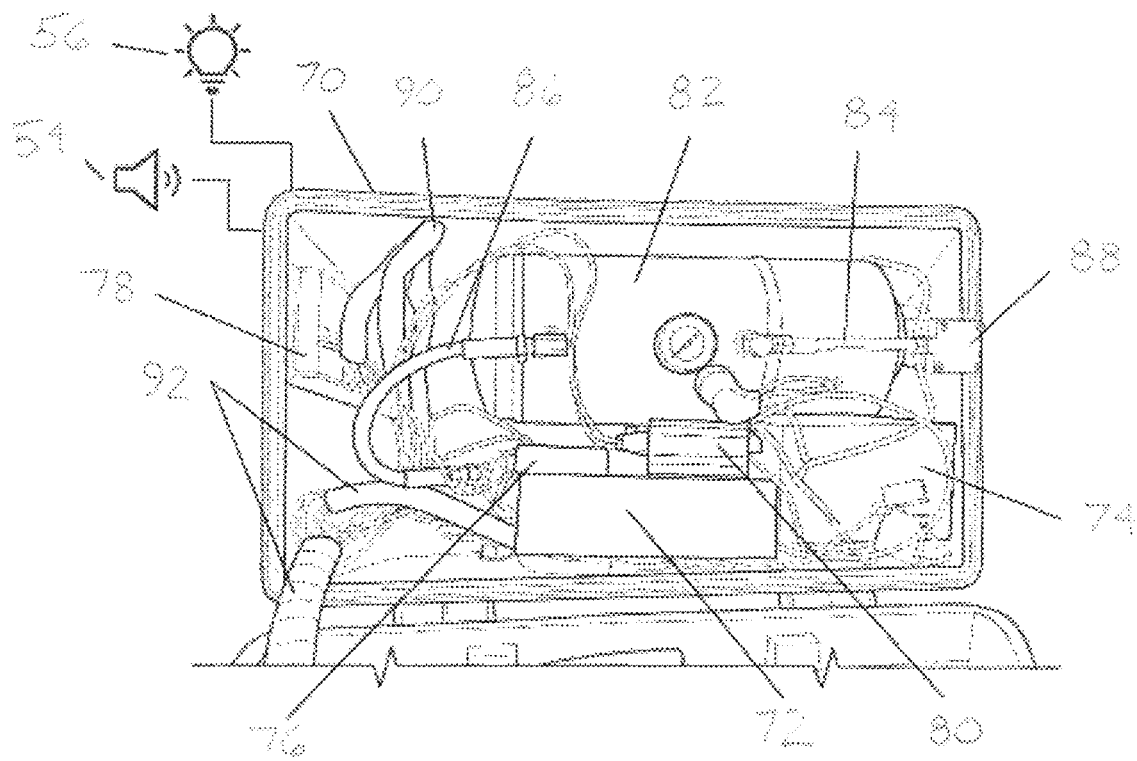
FIG. 5 is a partial sectional view of the bottom portion of the preferred embodiment of the warning system illustrated in FIGS. 1-3.

Referring now to FIG. 5, a partial sectional view of the bottom portion of preferred warning system 40 is illustrated. As shown in FIG. 5, the bottom portion of preferred warning system 40 comprises lower housing 70 which is adapted to house the components of the bottom portion of the system. Preferred warning system also comprises controller 72 which is adapted to control one or more of the plurality of components of the system. Preferred warning system 40 further comprises power source 74 which is adapted to provide power to one or more of the plurality of components of the system. Still further, preferred warning system 40 comprises voltage converters 76 and 78, power source charger 80, air compressor 82, air supply hoses 84 and 86, air intake valve 88, and cables 90 and 92. While FIG. 4 illustrates the preferred configuration and arrangement of the bottom portion of the warning system in accordance with the present invention, it is contemplated within the scope of the invention that the bottom portion may be of any suitable configuration and arrangement.

Figure 6:
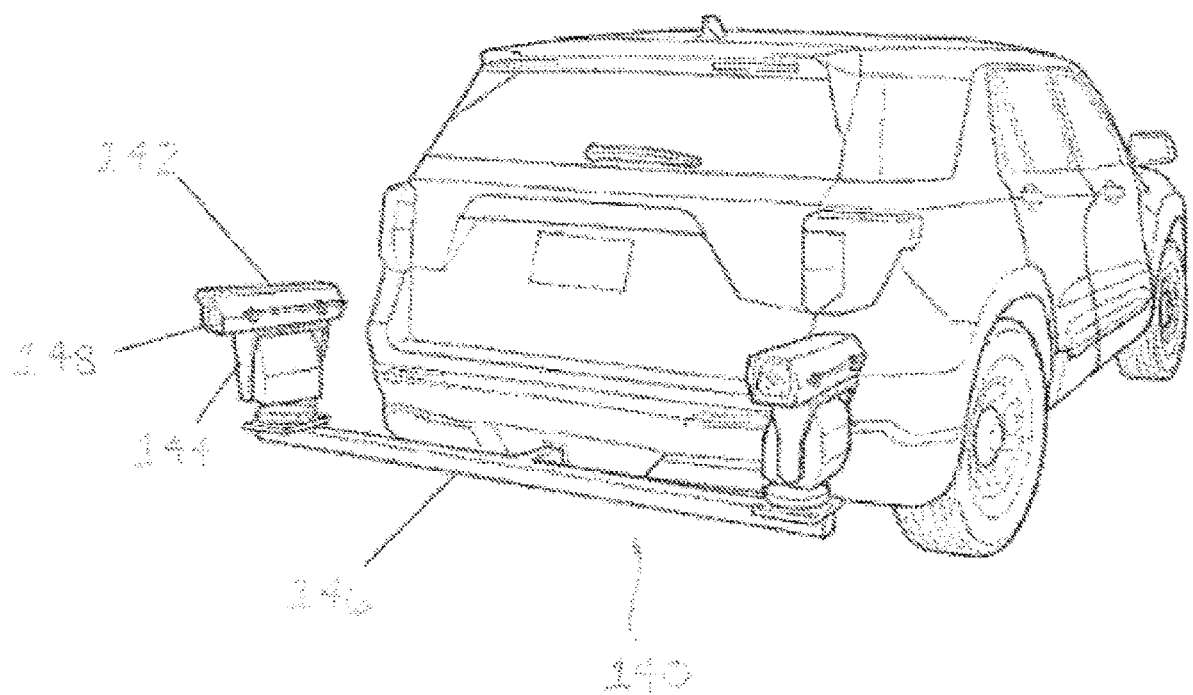
FIG. 6 is a front perspective view of a first alternative embodiment of the warning system in accordance with the present invention.

Referring now to FIG. 6, a front perspective view of a first alternative embodiment of the warning system in accordance with the present invention is illustrated. As shown in FIG. 6, the preferred embodiment is designated generally by reference numeral 140. Preferred warning system 140 is a dual-unit configuration that is adapted to be mounted on a motor vehicle. Each unit of preferred warning system 140 comprises housing 142, adjustment means 144, mounting means 146, and lens cover 148.

Figure 7:
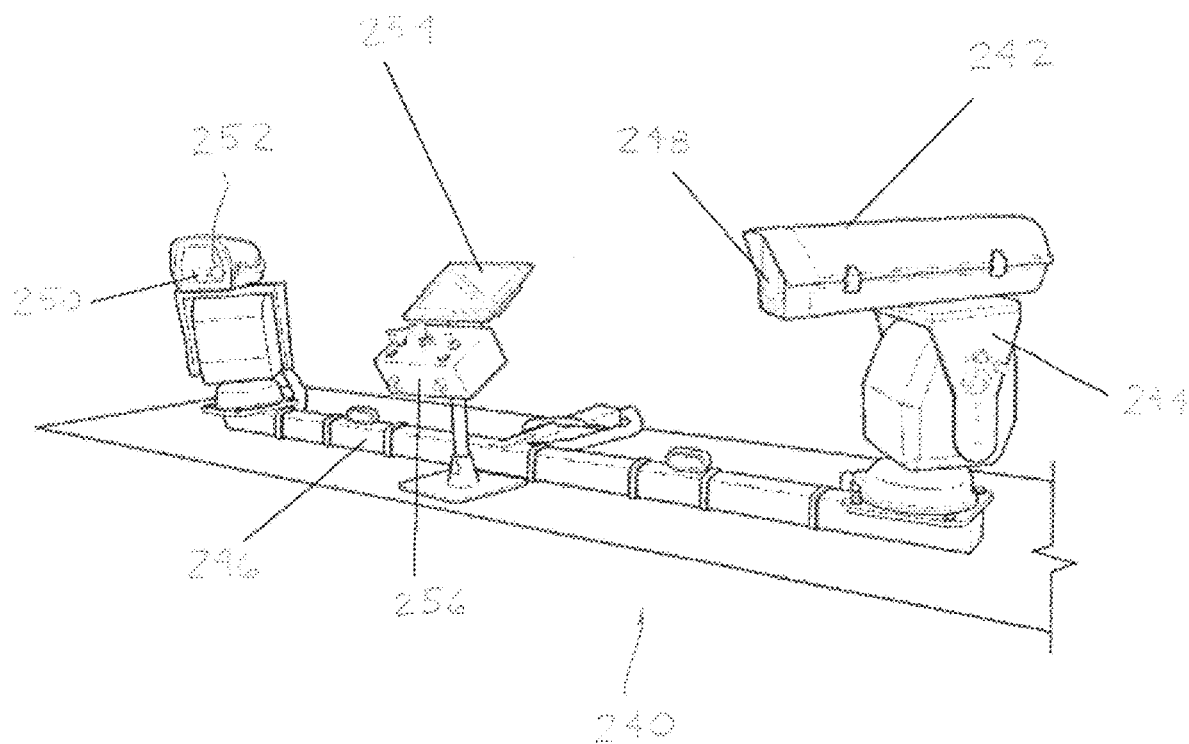
FIG. 7 is a front perspective view of a second alternative embodiment of the warning system in accordance with the present invention.

Referring now to FIG. 7, a second alternative embodiment of the warning system in accordance with the present invention is illustrated. As shown in FIG. 7, the preferred warning system is designated generally by reference numeral 240. Preferred warning system 240 comprises housing 242, adjustment means 244, mounting means 246, lens cover 248, and Lidar device 250. Preferred warning system 240 further comprises camera assembly 252, video monitor 254, and control box 256. Preferred control box 256 comprises a power switch, dual arming switches, and a directional joystick.

Figure 8:
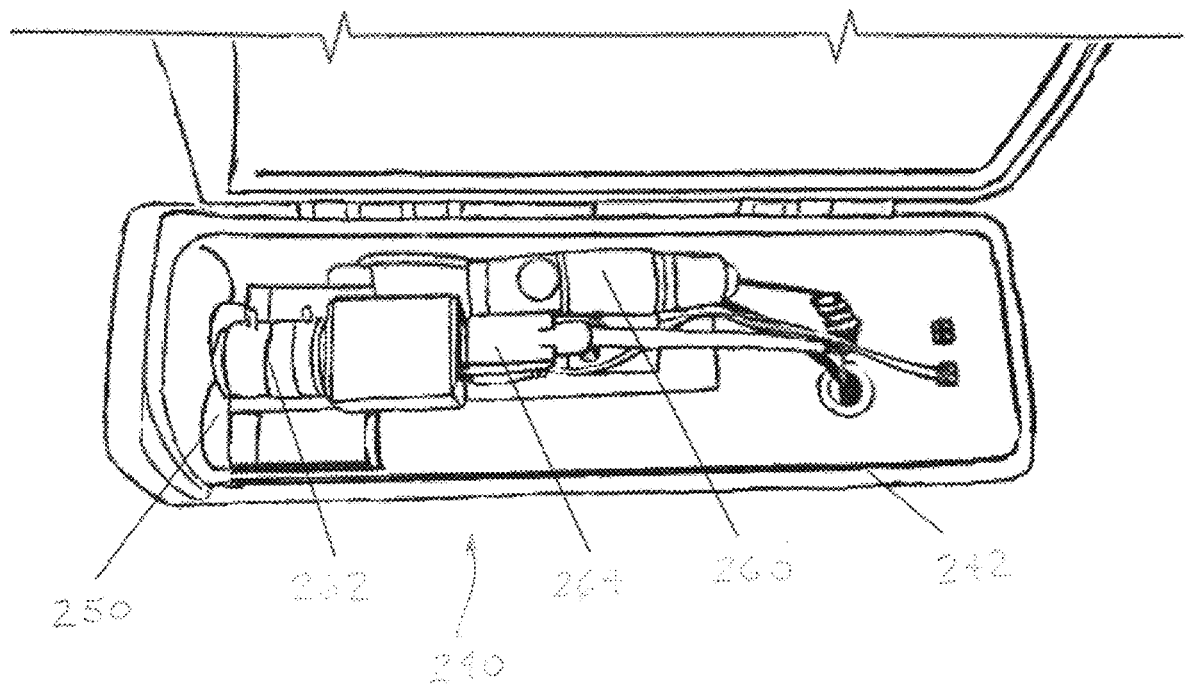
FIG. 8 is a partial sectional view of the second alternative embodiment of the warning system illustrated in FIG. 7.

Referring now to FIG. 8, a partial sectional top view of preferred warning system 240 is illustrated. As shown in FIG. 8, preferred warning system 240 is adapted to be mounted and provide video. Preferred warning system 240 comprises housing 242, Lidar device 250, sighting laser 260, telescopic targeting lens 262, and video camera interface 264. In some preferred embodiments, the video is displayed in the cabin of the vehicle.

Figure 9:
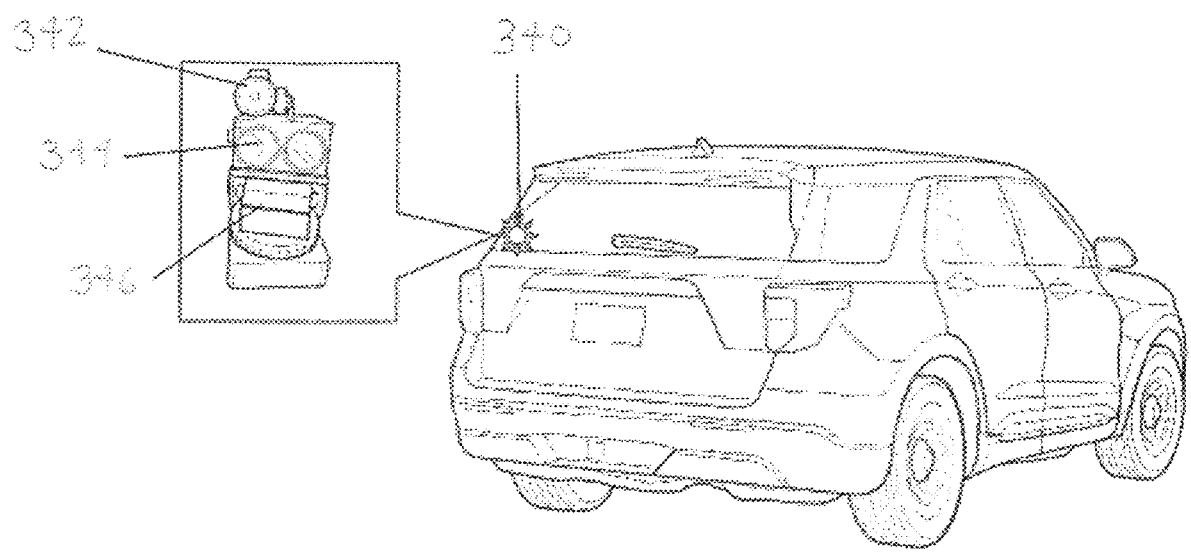
FIG. 9 is a partial sectional view of a third alternative embodiment of the warning system in accordance with the present invention.

Referring now to FIG. 9, a partial sectional view of a third alternative embodiment of the warning system in accordance with the present invention is illustrated. As shown in FIG. 9, the preferred warning system is designated generally by reference numeral 340. Preferred warning system 340 is a modular version of the device adapted to be mounted on the rear windshield of a motor vehicle and comprising sighting laser 342, Lidar device 344, and adjustment means 346.

Figure 10:
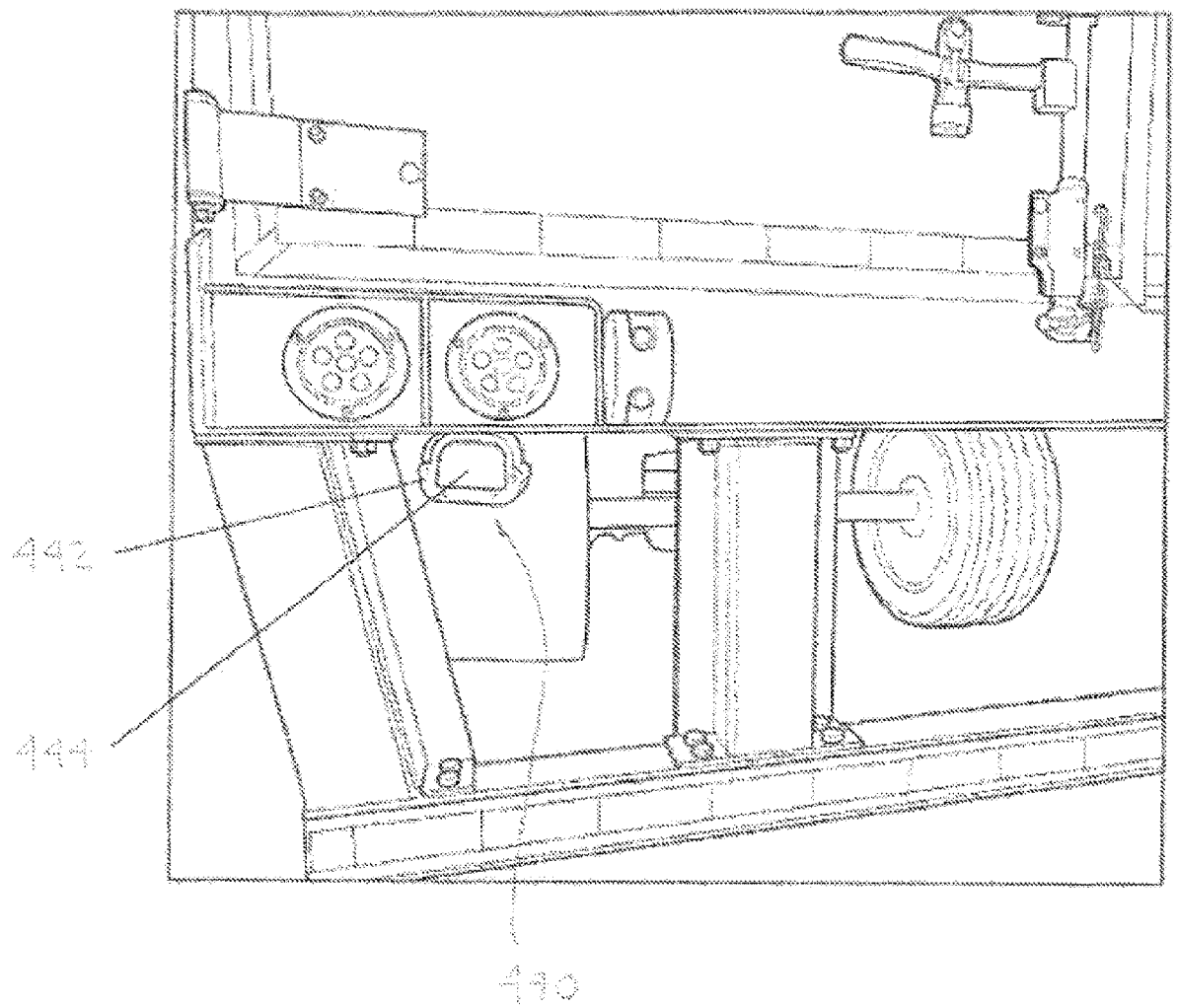
FIG. 10 is a front view of a fourth alternative embodiment of the warning system in accordance with the present invention.

Referring now to FIG. 10, a front view of a fourth alternative embodiment of the warning system in accordance with the present invention is illustrated. As shown in FIG. 10, the preferred warning system is designated generally by reference numeral 440. Preferred warning system 440 is a modular version of the device adapted to be mounted on the rear end of a motor vehicle and comprising housing 442 and lens cover 444.

Figure 11:
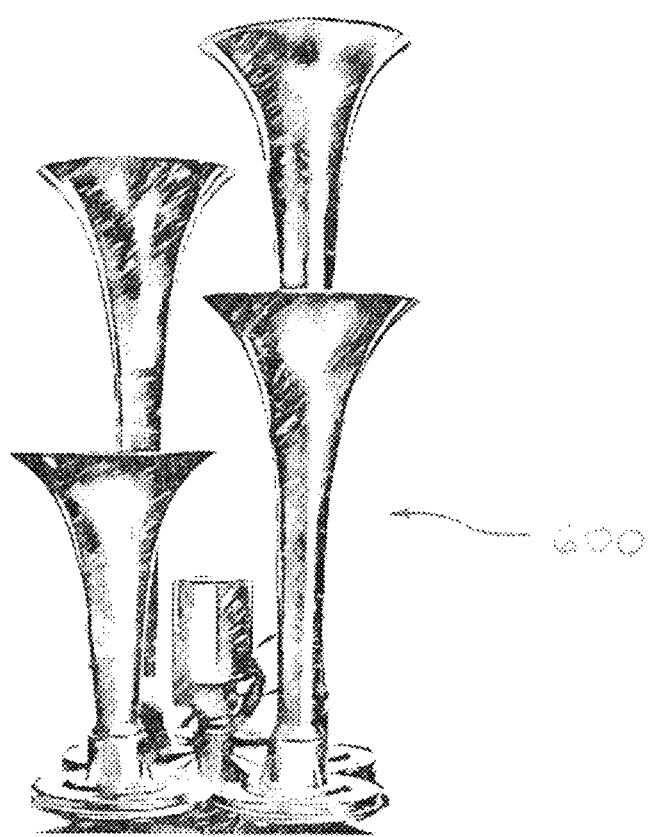
FIG. 11 is a front view of the preferred audio component of the warning systems illustrated in FIGS. 1-9.

Referring now to FIG. 11, a front view of the preferred audio source of the warning systems illustrated in FIGS. 1-9 is illustrated. As shown in FIG. 11, the preferred audio source is designated generally by reference numeral 600.

Figure 12:
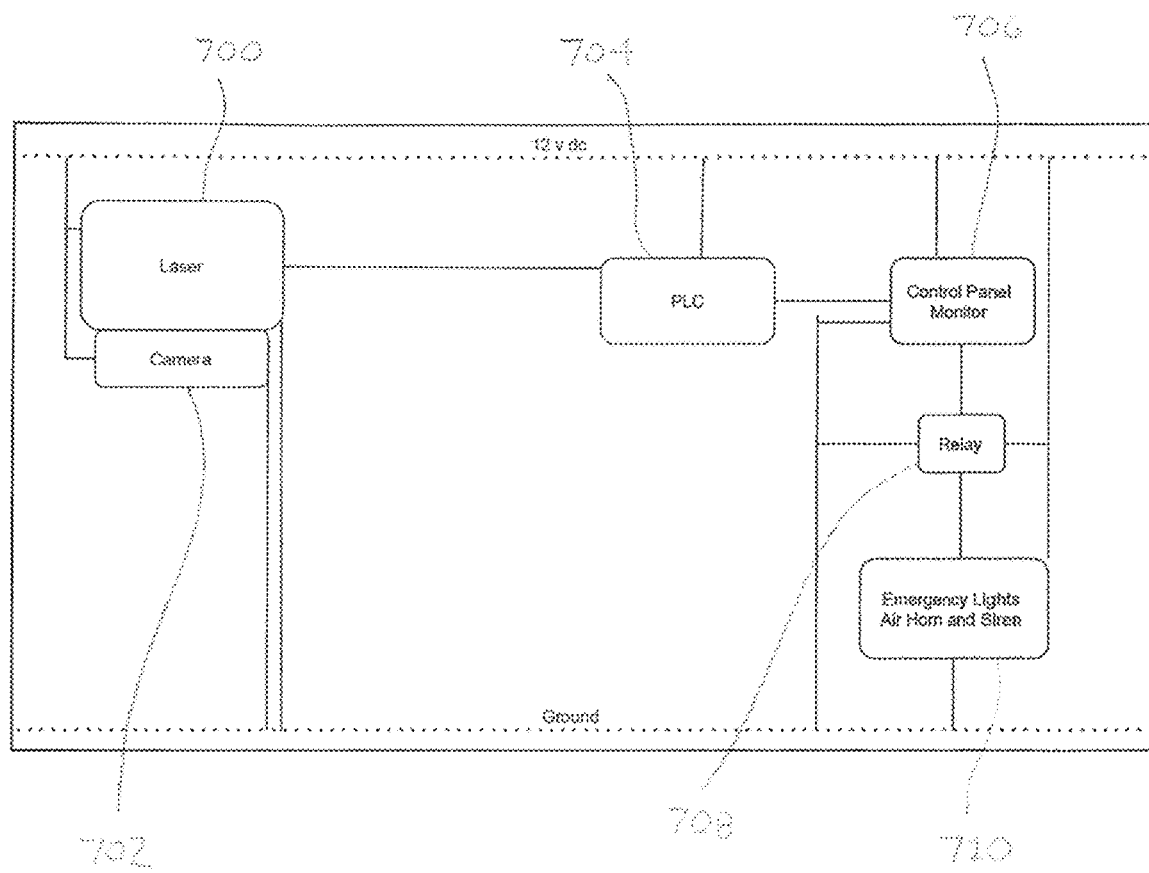
FIG. 12 is a schematic of the preferred warning systems illustrated in FIGS. 1-9.

Referring now to FIG. 12, a schematic of the preferred warning systems illustrated in FIGS. 1-9 is illustrated. As shown in FIG. 12, the preferred warnings system in accordance with the present invention generally comprise laser 700, camera 702, controller 704, control panel monitor 706, relay 708, and emergency lights, air horn, and siren 710.

Figure 13:
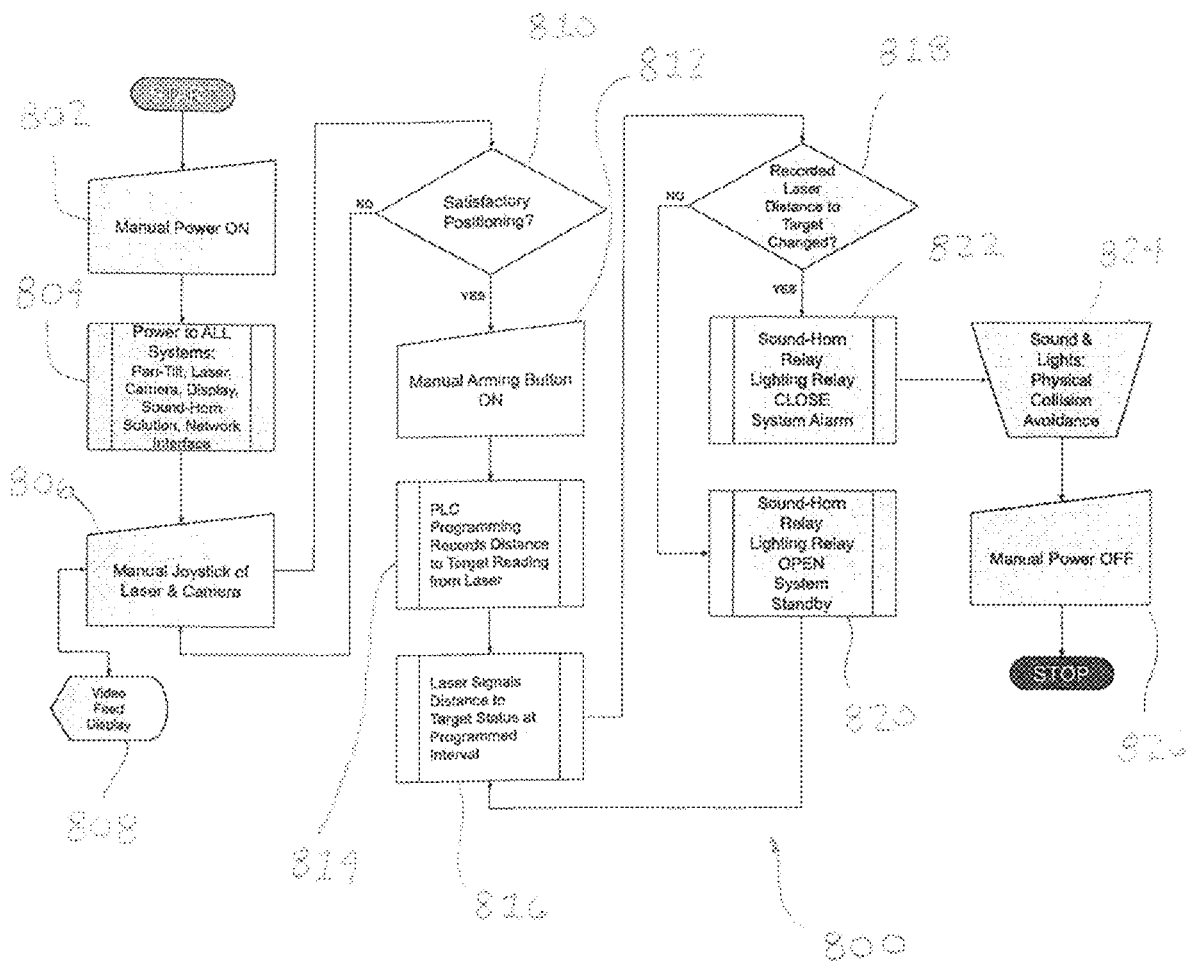
FIG. 13 is a flow chart illustrating the preferred process of the warning system embodiments including electronic and video targeting.

Referring now to FIG. 13, a flow chart illustrating the preferred process of the warning system embodiments including electronic and video targeting is illustrated. As shown in FIG. 13, the preferred process is designated generally by reference numeral 800. Preferred process 800 begins with manual power ON at 802, then power to all systems at 804, then to manual joystick of the Lidar device and camera at 806 which results in video feed display at 808. Next, if the positioning of the Lidar device is not satisfactory at 810, then the process returns to the manual joystick of the Lidar device and camera at 806. If, on the other hand, the positioning of the Lidar device is satisfactory at 810, then the manual arming button is ON at 812, the controller records the distance to the target reading from the laser at 814, and the laser signals the distance to the target status at a programmed interval at 816. Next, the preferred systems determine whether the recorded laser distance to the target has changed at 818. If the recorded laser distance to the target has not changed, then the audio source relay and the light source relay remain OPEN, the system remains on standby at 820, and the process returns to 816. If, on the other hand, the recorded laser distance to the target has changed, then the audio source relay and the light source relay CLOSE the system alarm at 822, and the audio source and light source are activated at 824. To end the process, the operated activates the manual power OFF at 826.

Figure 14:
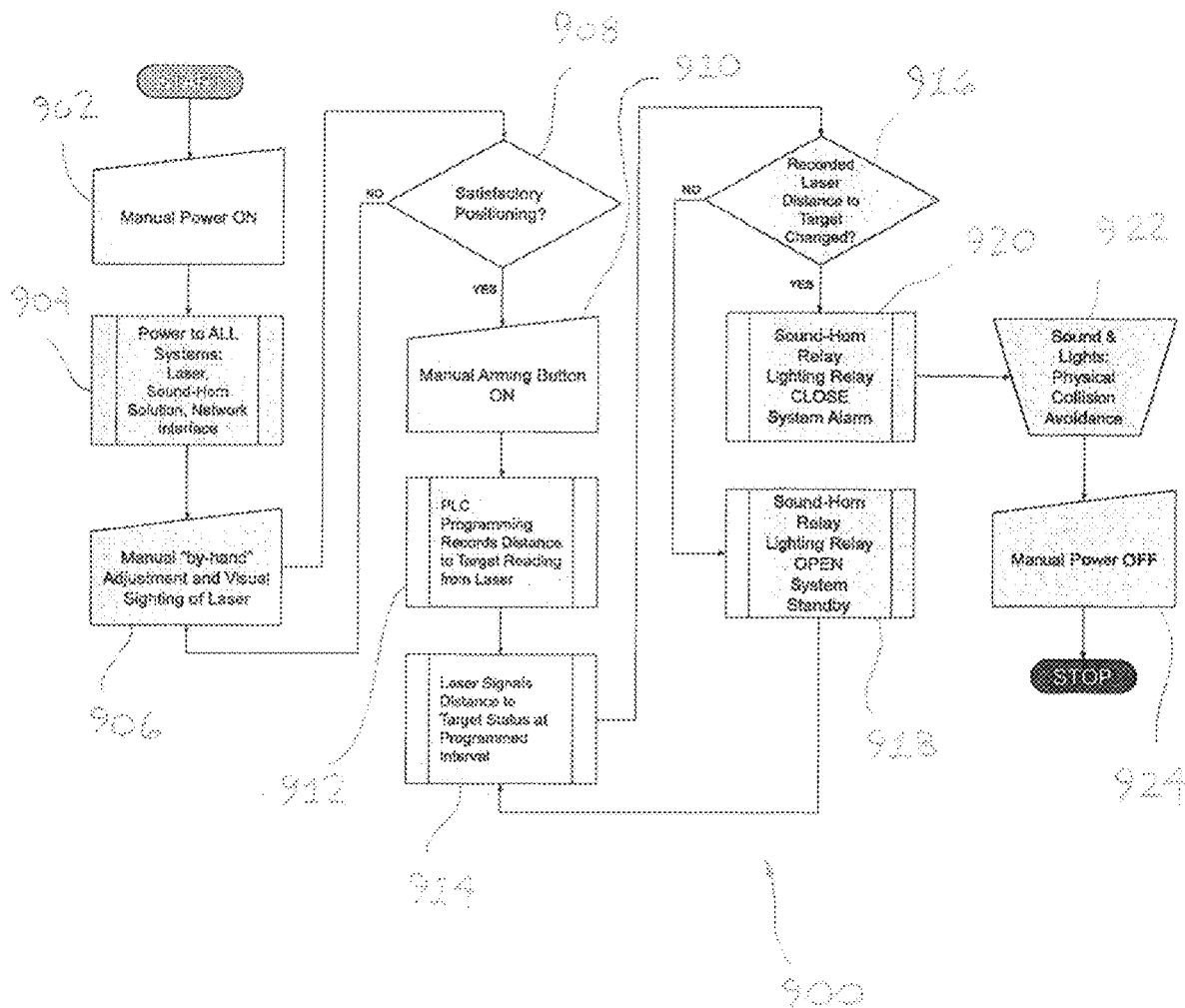
FIG. 14 is a flow chart illustrating the preferred process of the warning system embodiments including non-electronic and non-video targeting.

Referring to FIG. 14, a flow chart illustrating the preferred process of the warning system embodiments including non-electronic and non-video targeting is illustrated. As shown in FIG. 14, the process is designated generally by reference numeral 900. Preferred process 900 comprises substantially the same first two steps at 902 and 904 as preferred process 800 at 802 and 804. Next, preferred process 900 comprises manual adjustment and visual sighting of the Lidar device at 906. The remainder of preferred process 900 at steps 908, 910, 912, 914, 916, 918, 920, 922, and 924 are substantially the same as the steps of preferred process 800 at steps 810, 812, 814, 816, 818, 820, 822, 824, and 826.

Figure 15:
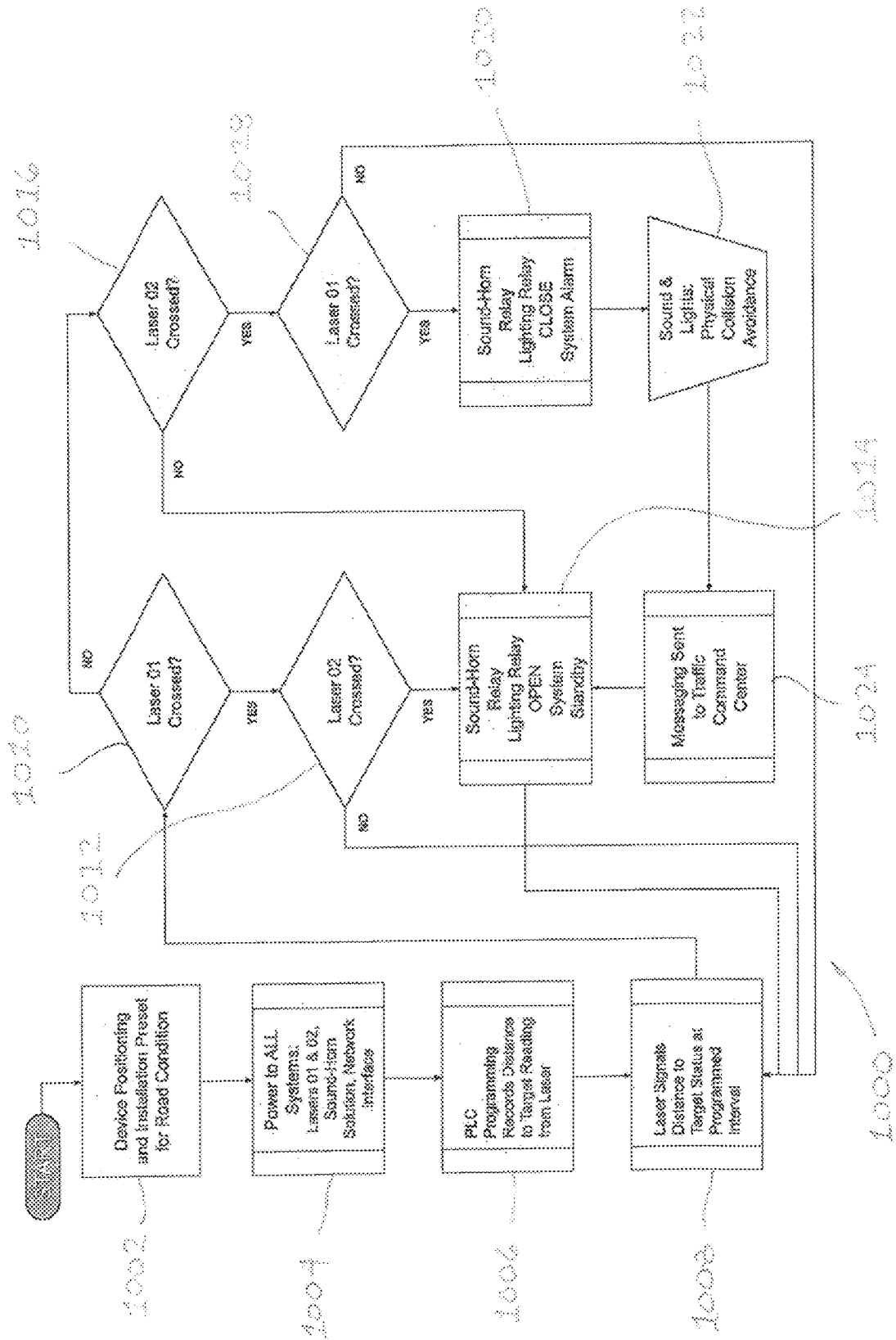
FIG. 15 is a flow chart illustrating the preferred process of the warning system embodiments for detecting a wrong-way driver.

Referring to FIG. 15, a flow chart illustrating the preferred process of the warning system embodiments for detecting a wrong-way driver is illustrated. As shown in FIG. 15, the preferred process is designated generally by reference numeral 1000. Preferred process 1000 begins with device positioning and installation preset for road condition at 1002, power to all systems at 1004, controller records the distance to the target reading from the Lidar device at 1006, and laser signals the distance to the target status at a programmed interval at 1008. Next, the system determines if a first laser has been crossed at 1010. If the first laser has been crossed, then the system determines if a second laser has been crossed at 1012. If the second laser has been crossed, then the audio source and/or light source relays are OPEN and the system is on standby at 1014 and the process returns to 1008. If the second laser has not been crossed, then the process restarts at 1008. If, on the other hand, the first laser is not crossed at 1010, then the system determines if the second laser has been crossed at 1016. If the second laser has not been crossed at 1016, then the process returns to 1014 and then to 1008. If, on the other hand, the second laser at 1016 has been crossed, then the system determines whether the first laser has been crossed at 1018. If the first laser has not been crossed at 1018, then the process returns to 1008. If, on the other hand, the first laser has been crossed at 1018, then the audio source and/or light source relays CLOSE at 1020, the audio source and/or light source are activated at 1022, messaging is sent to a traffic command center at 1024, and the process returns to 1014.

Figure 16:
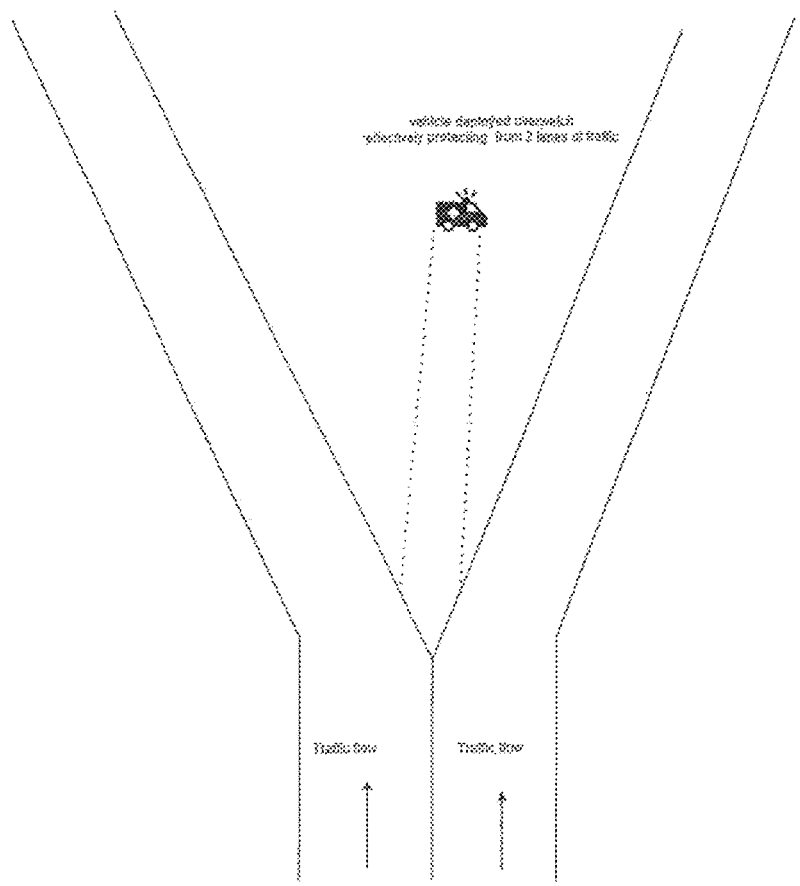
FIG. 16 is a schematic view of a preferred deployment of the warning system in accordance with the present invention.

Referring now to FIG. 16, a schematic view of a preferred deployment of the warning system in accordance with the present invention is illustrated. As shown in FIG. 16, the preferred deployment relates to two lanes of traffic. More particularly, in this deployment a commercial or first responder vehicle is stopped on the right shoulder of a road or highway. The vehicle attendant will deploy the Alpha Overwatch system positioning the targeting module along the painted shoulder line (left side of the vehicle/driver's side). The vehicle attendant will then arm the system, protecting the driver from oncoming vehicles which might cross the invisible barrier, due to a distracted driver or moth-effect driver, i.e., a driver whose vehicle moves toward a roadside hazard like a moth is attracted by a light source. Alternatively, a commercial or first responder vehicle stopped on the left shoulder of a road or highway can deploy the Alpha Overwatch system positioning the targeting module along the painted shoulder line (right side of the vehicle/passenger side), sighting behind the vehicle appropriate and possible distances, alerting stationary and oncoming traffic if the invisible barrier is crossed due to a distracted driver or moth-effect driver. In another deployment, a commercial or first responder vehicle is stopped at an intersection where the roadway splits into multiple lanes. The vehicle attendant can deploy both left and right Alpha Overwatch systems configuring the targeting modules in a V-shape along painted lines (right or left as appropriate), thereby alerting stationary and oncoming traffic the invisible barrier is crossed due to a distracted driver or moth-effect driver.

Figure 17:
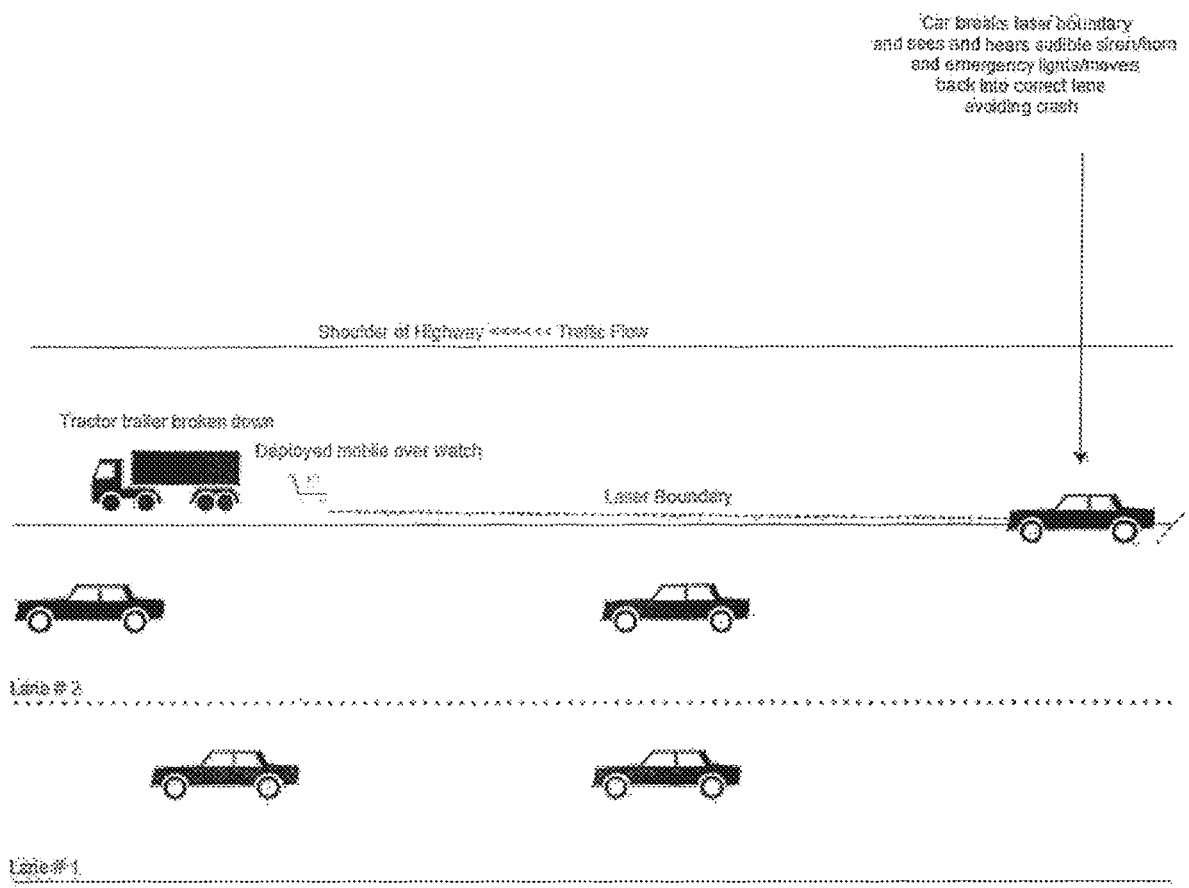
FIG. 17 is a schematic view of a first alternative deployment of the warning system in accordance with the present invention.

Referring now to FIG. 17, a schematic view of a first alternative deployment of the warning system in accordance with the present invention is illustrated. As shown in FIG. 26, the preferred deployment relates to a portable embodiment of the warning system. More particularly, in this deployment the Alpha Overwatch system can be configured as a portable, wireless system suitable in circumstances where a vehicle mounted line-of-site application is not practical. For example, a wrecker attendant may place the Alpha Overwatch system behind the vehicle being rescued with a rollback and configure the targeting module manually on the mobile unit. In this configuration Alpha Overwatch can be deployed as a standalone solution that can be easily positioned anywhere to protect workers as well as alert a distracted driver or moth-effect driver.

Figure 18:
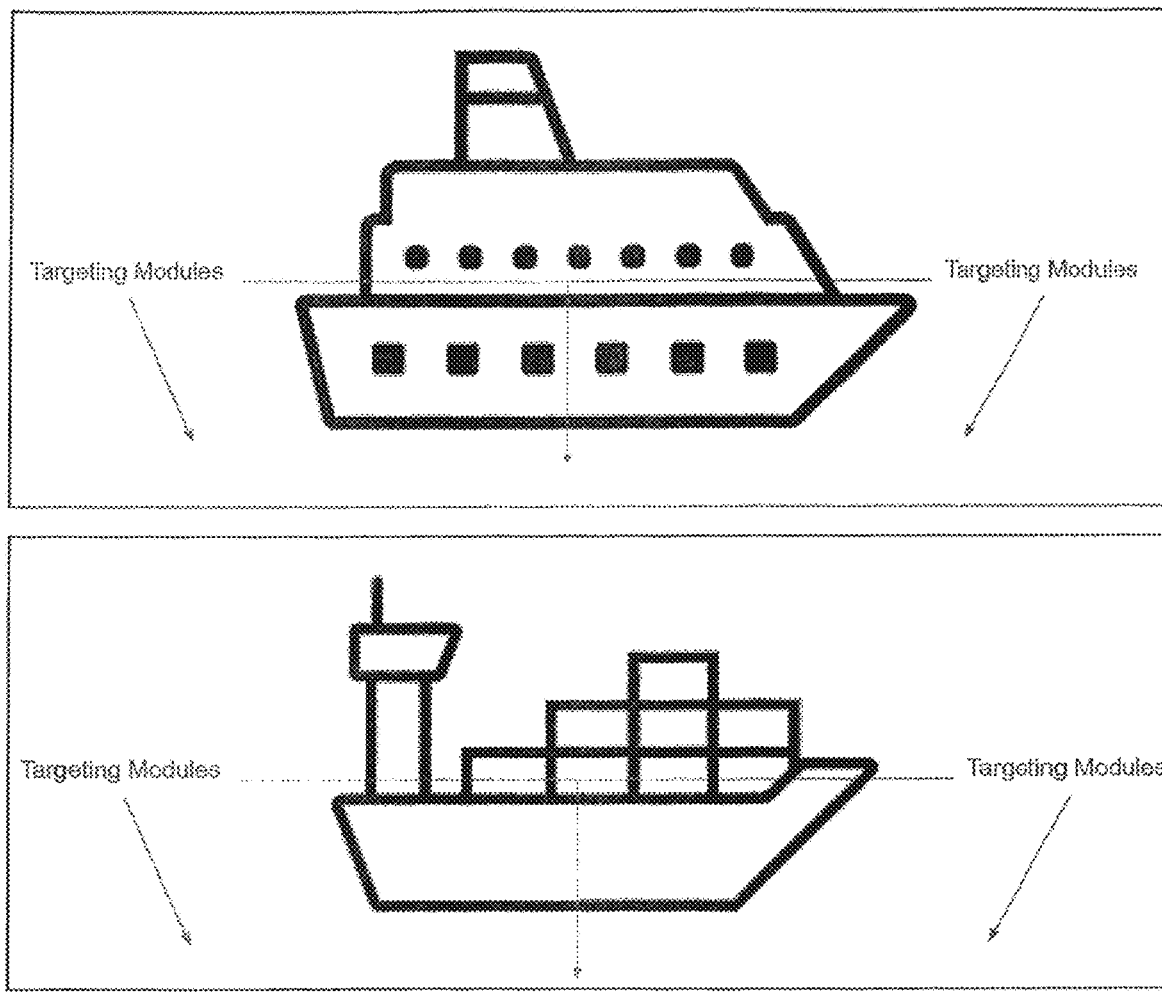
FIG. 18 is a schematic view of a second alternative deployment of the warning system in accordance with the present invention.

Referring now to FIG. 18, a schematic view of a second alternative deployment of the warning system in accordance with the present invention is illustrated. As shown in FIG. 18, the preferred deployment relates to a nautical deployment of the warning system. More particularly, in this deployment, the Alpha Overwatch system can is deployed on ships to detect anyone or anything falling off or jumping off the ship from bow to stern and/or port to starboard. Targeting modules may be configured to detect departures from the ship deck (alerting audibly and visually), or alert if something gets too close to a section of the ship's hull. This configuration is practical for cruise ships, barges, cargo ships, and other nautical vehicles.

Figure 19:
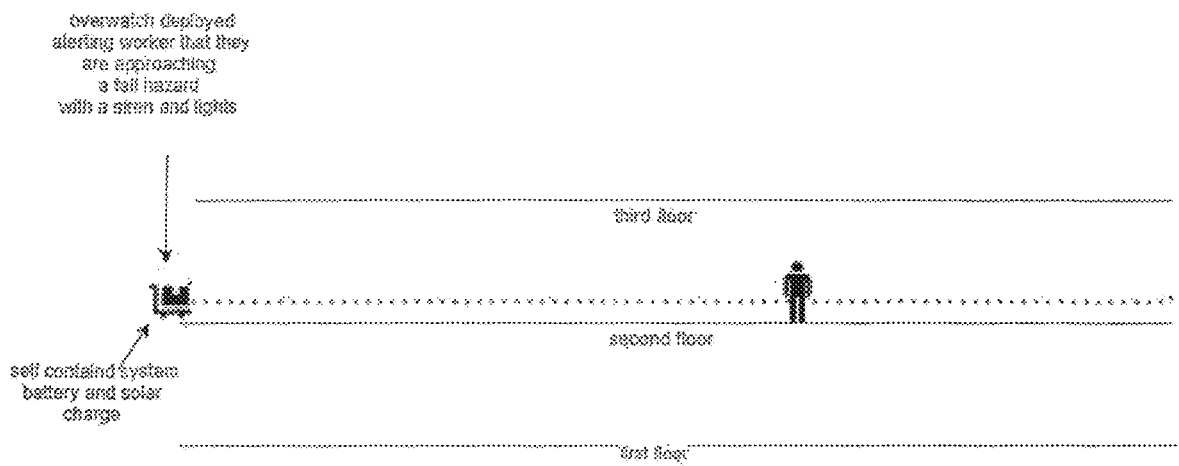
FIG. 19 is a schematic view of a third alternative deployment of the warning system in accordance with the present invention.

Referring now to FIG. 19, a schematic view of a third alternative deployment of the warning system in accordance with the present invention is illustrated. As shown in FIG. 19, the preferred deployment relates to a fall prevention deployment of the warning system. More particularly, in this deployment, the ALPHA Overwatch system is deployed on multi-story, high-rise buildings or edifice construction sites. When targeting modules are configured along a fall hazard zone, the system will alert workers via audible and visual communication methods when they are too close to an opening where they could potentially fall from the structure.

Figure 20:
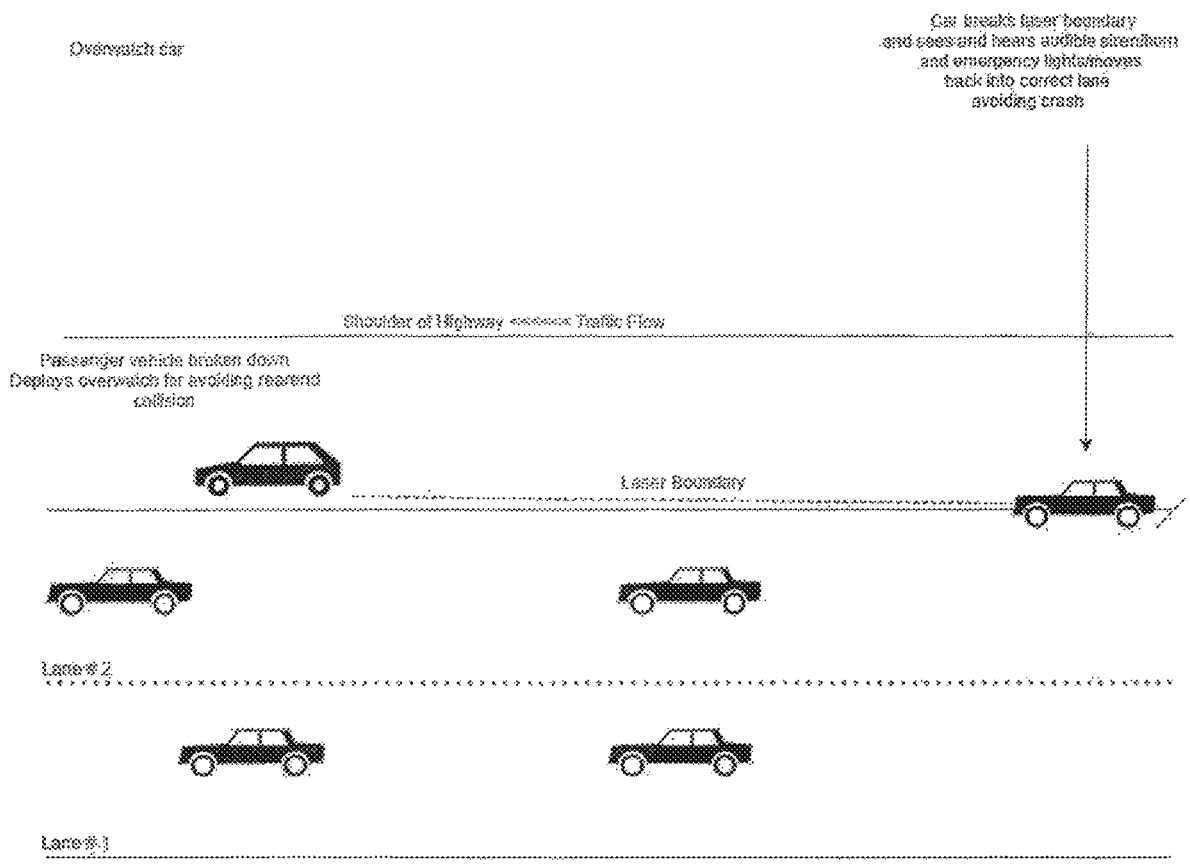
FIG. 20 is a schematic view of a fourth alternative deployment of the warning system in accordance with the present invention.

Referring now to FIG. 20, a schematic view of a fourth alternative deployment of the warning system in accordance with the present invention is illustrated. As shown in FIG. 20, the preferred deployment relates to an automobile deployment of the warning system. More particularly, in this deployment the ALPHA Overwatch system is deployed on a distressed passenger vehicle on the shoulder of a road or highway in order to alert of possible rear-end collisions due to a distracted driver or moth-effect driver. The system can be deployed with a preconfigured protection zone (with targeting modules preconfigured) or allow the driver to manually configure the protection zone.

Figure 21:
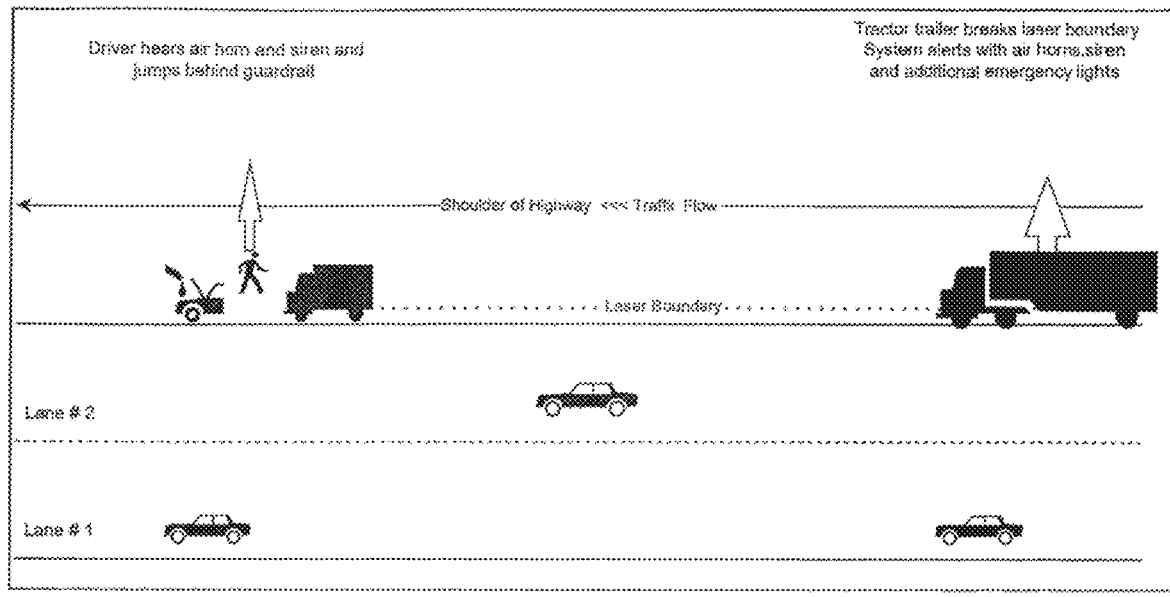
FIG. 21 is a schematic view of a fifth alternative deployment of the warning system in accordance with the present invention.

Referring now to FIG. 21, a schematic view of a fifth alternative deployment of the warning system in accordance with the present invention is illustrated. As shown in FIG. 21, the preferred deployment relates to a responder deployment of the warning system. More particularly, in this deployment, a Highway Incident Response vehicle is parked on the shoulder of the roadway assisting a troubled vehicle. The Incident Response professional configures the Alpha OverWatch boundary targeting module which will detect if another oncoming vehicle breaches the invisible barrier. Preferably, the boundary targeting module permits the user to define the shape, size, distance, and other physical characteristics of the invisible barrier. In this scenario, a vehicle might cross the painted shoulder line (aligned with the OverWatch targeting module) due to a distracted driver or moth-effect driver, triggering the audible and visual alerts. This warns the Incident Response professional and the stranded vehicle who are all able to flee the danger prior to impact. The alert could also potentially warn the driver who crossed the painted line who may adjust their trajectory prior to impact, thus avoiding the accident entirely.

Figure 22:
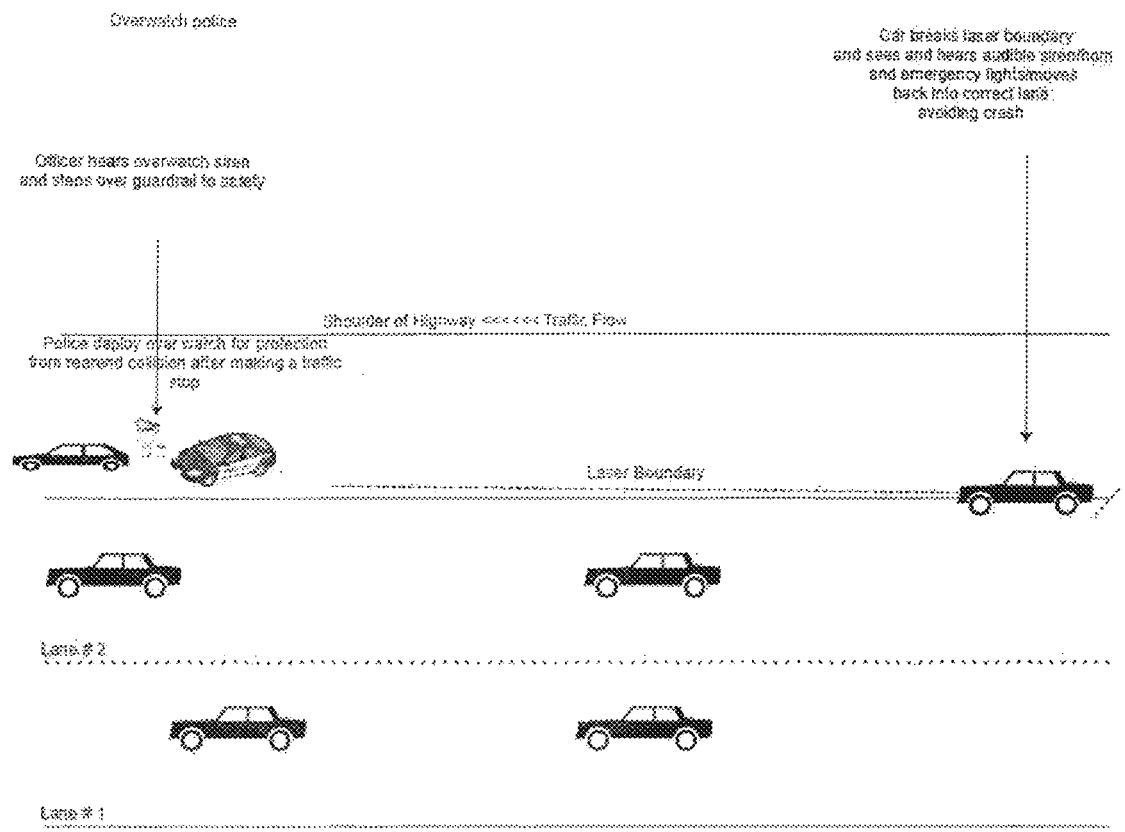
FIG. 22 is a schematic view of a sixth alternative deployment of the warning system in accordance with the present invention.

Referring now to FIG. 22, a schematic view of a sixth alternative deployment of the warning system in accordance with the present invention is illustrated. As shown in FIG. 22, the preferred deployment relates to a law enforcement deployment of the warning system. More particularly, in this deployment, a law enforcement officer on the highway or roadway can configure the ALPHA Overwatch system to alert regarding a rear end collision due to a distracted driver or moth-effect driver. The system can be deployed using one or multiple detection modules per law enforcement vehicle, alerting an approaching vehicle of an impending rear-end crash with audible and visual alerts and alerting the officer of the potential collision.

Figure 23:
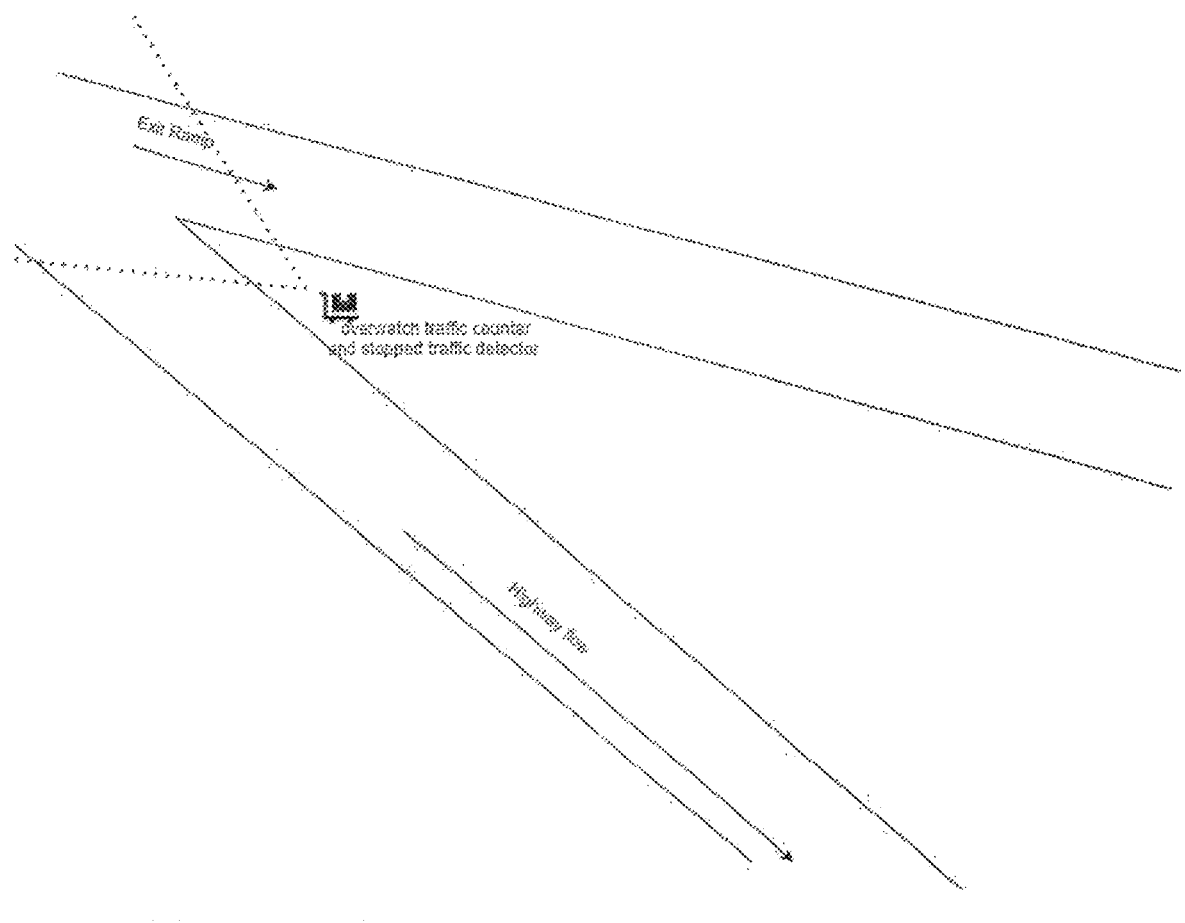
FIG. 23 is a schematic view of a seventh alternative deployment of the warning system in accordance with the present invention.

Referring now to FIG. 23, a schematic view of a seventh alternative deployment of the warning system in accordance with the present invention is illustrated. As shown in FIG. 23, the preferred deployment relates to a traffic counter deployment of the warning system. More particularly, in this deployment, the ALPHA Overwatch system can be configured as a traffic counter solution. For this scenario, the system can be deployed into a single lane of traffic or mounted to an overhead structure (such as a road sign spanning the lanes or an overpass_above multiple lanes of traffic with each targeting module designated for one lane of traffic. In this configuration, the ALPHA Overwatch unit can count the passing cars, but audible or visual alerting would not be needed. Optionally, the system could alert a command center if the traffic is stopped. Monitoring can be done via network connectivity and the use of specialized programming which would transmit the alert.

Figure 24:
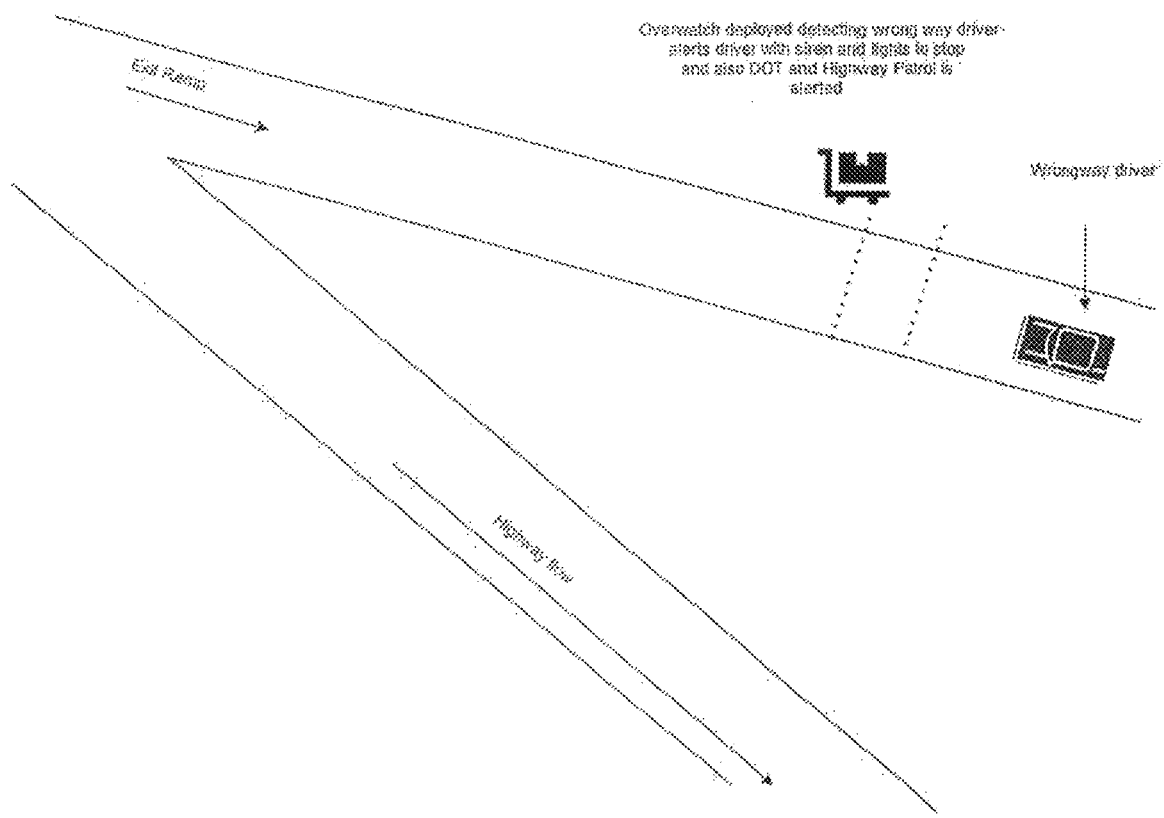
FIG. 24 is a schematic view of an eighth alternative deployment of the warning system in accordance with the present invention.

Referring now to FIG. 24, a schematic view of an eighth alternative deployment of the warning system in accordance with the present invention is illustrated. As shown in FIG. 24, the preferred deployment relates to a wrong-way driver deployment of the warning system. More particularly, in this deployment, the ALPHA Overwatch system can be configured to audibly and visually alert an offending, wrong-way driver that they have driven into a Wrong Way ramp situation due to driver distraction or impairment. Dual Overwatch targeting modules may be mounted on an exit ramp and/or along emergency lanes. Monitoring can be accomplished via network connectivity and the use of specialized programming which would transmit the alert. The device is capable of wired or wireless Internet connectivity suitable for transmission of device messaging (such as system armed, system in alarm, crash detected) to a suitable command center or application platform (such as Waze, Google Maps, Traffic Command Center, and the like).

The invention also comprises a method for providing a warning in the event a foreign object is detected. The preferred method comprises providing a warning system having a plurality of components including a Lidar device that is adapted to emit one or more laser beams, an adjustment means that is adapted to adjust the Lidar device, an audio source that is adapted to generate an audible sound, a light source that is adapted to generate a light signal, a controller that is adapted to control one or more of the plurality of components of the system, and a power source that is adapted to provide power to one or more of the plurality of components of the system. The preferred warning system produces at least one of the audible sound and the light signal when the one or more laser beams detects a foreign object. The preferred method also comprises providing a warning in the event a foreign object is detected. In other preferred embodiments of the method of the invention, the method comprises providing a warning system having a housing and a sighting laser.

In operation, several advantages of the preferred embodiments of the warning system are achieved. For example, the preferred embodiments of the warning system provide an audible and/or visual warning. The preferred embodiments of the warning system are operable independent of networked computers, vehicles, mobile/cellular devices, Wi-Fi devices, and/or secondary surfaces. The preferred embodiments of the warning system are portable or mobile. The preferred embodiments of the warning system are adapted to detect vehicles travelling in the wrong direction and/or count vehicles. The preferred embodiments of the warning system are also adapted prevent falls.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A warning system comprising:
   (a) a Lidar device being adapted to emit one or more laser beams configured to detect a first foreign object travelling in a first direction and a second foreign object travelling in a second direction, wherein the first and second directions are opposite directions;
   (b) an audio source configured to generate an audible sound when a first relay is closed and not generate the audible sound when the first relay is open;
   (c) a light source configured to generate a light signal when a second relay is closed and not generate the light signal when the second relay is open; and
   (d) a controller configured to:
      (i) determine whether the first foreign object has crossed a first laser;
      (ii) determine, in response to determining that the first foreign object has crossed the first laser, whether the first foreign object has crossed a second laser;
      (iii) open the first relay and open the second relay in response to determining that the first foreign object has crossed both the first laser and the second laser;
      (iv) determine whether the second foreign object has crossed the second laser;
      (v) determine, in response to determining that the second foreign object has crossed the second laser, whether the second foreign object has crossed the first laser; and
      (vi) close at least one of the first relay or the second relay in response to determining that the second foreign object has crossed both the second laser and the first laser.

2. The warning system of claim 1 wherein the warning system is configured to generate at least one of the audible sound by the audio source or the light signal by the light source independent of networked computers.

3. The warning system of claim 1 wherein the warning system is operable independent of a vehicle.

4. The warning system of claim 1, wherein the first laser is configured to detect when either of the first foreign object or the second foreign object has crossed a first threshold distance from the warning system and the second laser is configured to detect when either of the first foreign object or the second foreign object has crossed a second threshold distance from the warning system.

5. The warning system of claim 4 wherein the first threshold distance is closer to the warning system than the second threshold distance.

6. The warning system of claim 1 wherein the controller in the warning system is configured to close both the first relay and the second relay in response to determining that the second foreign object has crossed both the second laser and the first laser.

7. The warning system of claim 1 wherein the controller is further configured to determine whether the second foreign object has crossed the first laser before performing the step (iv) of determining whether the second foreign object has crossed the second laser.

8. The warning system of claim 1 wherein the warning system is portable.

9. The warning system of claim 8 wherein the warning system is mobile.

10. The warning system of claim 1 wherein the warning system is configured to detect a vehicle travelling in the wrong direction.

11. The warning system of claim 10 wherein the warning system is configured to send a message to a traffic control center in response to detecting a vehicle travelling in the wrong direction.

12. The warning system of claim 1 further comprising a sighting laser.

13. A method for a warning system to provide a warning in the event a foreign object is detected travelling in a wrong direction, said method comprising:
   (a) providing a plurality of components in the warning system, said warning system comprising:
      (i) a Lidar device being adapted to emit one or more laser beams configured to detect a first foreign object travelling in a first direction and a second foreign object travelling in a second direction, wherein the first and second directions are opposite directions;
      (ii) an audio source configured to generate an audible sound when a first relay is closed and not generate the audible sound when the first relay is open; and
      (iii) a light source configured to generate a light signal when a second relay is closed and not generate the light signal when the second relay is open; and
   (b) determining whether the first foreign object has crossed a first laser;
   (c) determining, in response to determining that the first foreign object has crossed the first laser, whether the first foreign object has crossed a second laser;
   (d) opening the first relay and opening the second relay in response to determining that the first foreign object has crossed both the first laser and the second laser;
   (e) determining whether the second foreign object has crossed the second laser;
   (f) determining, in response to determining that the second foreign object has crossed the second laser, whether the second foreign object has crossed the first laser; and
   (g) closing at least one of the first relay or the second relay in response to determining that the second foreign object has crossed both the second laser and the first laser.

14. The method of claim 13 further comprising steps of: using the first laser to detect when either of the first foreign object or the second foreign object has crossed a first threshold distance from the warning system; and using the second laser to detect when either of the first foreign object or the second foreign object has crossed a second threshold distance from the warning system.

15. The method of claim 14 wherein the first threshold distance is closer to the warning system than the second threshold distance.

16. The method of claim 13 further comprising a step of determining whether the second foreign object has crossed the first laser before performing the step (e) of determining whether the second foreign object has crossed the second laser.

17. The method of claim 13 further comprising a step of sending a message to a traffic control center in response to closing at least one of the first relay or the second relay.

18. The method of claim 13 further comprising a step of adjusting at least one of an orientation or a position of a Lidar device in the warning system to enable the Lidar device to detect the first foreign object and the second foreign object.

19. The method of claim 13 wherein the first foreign object is a vehicle travelling in a first direction and the second foreign object is a vehicle travelling in a second direction, wherein the first and second directions are opposite directions.

20. The method of claim 13 wherein the step of closing at least one of the first relay or the second relay further comprises closing both the first relay and the second relay.

* * * * *